US006786752B1

(12) United States Patent
Kerekes et al.

(10) Patent No.: US 6,786,752 B1
(45) Date of Patent: Sep. 7, 2004

(54) CONNECTOR FOR CONNECTING WELDING TORCH

(76) Inventors: Lajos Kerekes, Felsódunasor 13, H-1238, Budapest (HU); László Mésázros, Erzsébet ut 51, H-2030, Erd (HU); Antal Natta, Zalka Máté u. 7, H-2049, Diósd (HU); Antalné Natta, Zalka Máté u. 7, H-2049, Diósd (HU); Ferenc Natta, Bajcsy Zsilinszki u. 6, H-2049, Diósd (HU)

( * ) Notice: Subject to any disclaimer, the term of this patent is extended or adjusted under 35 U.S.C. 154(b) by 0 days.

(21) Appl. No.: 10/018,562
(22) PCT Filed: Jun. 14, 2000
(86) PCT No.: PCT/HU00/00056

§ 371 (c)(1),
(2), (4) Date: Apr. 5, 2002

(87) PCT Pub. No.: WO01/00364

PCT Pub. Date: Jan. 4, 2001

(30) Foreign Application Priority Data

Jun. 14, 1999 (HU) .............................................. 9901959
Jun. 14, 2000 (HU) ............................................. 0002269

(51) Int. Cl.⁷ ................................................ H01R 4/50
(52) U.S. Cl. .................... 439/339; 439/551; 219/137.63
(58) Field of Search ................................ 439/339, 550, 439/551; 219/137.63, 137.9

(56) References Cited

U.S. PATENT DOCUMENTS

| 4,052,116 A | * | 10/1977 | Sanders et al. | ................ | 439/27 |
| 4,864,099 A | | 9/1989 | Cusick et al. | ........... | 219/137.62 |
| 5,718,831 A | * | 2/1998 | Zigliotto | ................ | 219/121.48 |
| 5,902,150 A | * | 5/1999 | Sigl et al. | ................... | 439/587 |

FOREIGN PATENT DOCUMENTS

| DE | 296 16 343 U1 | 11/1995 |
| DE | 196 31 090 A1 | 2/1998 |
| EP | 0 794 029 A1 | 9/1997 |

OTHER PUBLICATIONS

International Search Report, PCT/HU00/00056, Oct. 17, 2000.
International Preliminary Examination Report, PCT/HU00/00056, Jul. 11, 2001.
NASA Tech Brief, "Ceramic Welding–Torch Extension," 2301 *N.T.I.S. Tech Notes*, Aug. 1988.

* cited by examiner

*Primary Examiner*—Renee Luebke
*Assistant Examiner*—Ann McCamey
(74) *Attorney, Agent, or Firm*—Kolisch Hartwell, P.C.

(57) ABSTRACT

The invention relates to a connector for connecting welding torch, more particularly, it relates to the socket-like connecting member to be mounted on a welding apparatus. The essential character of the connector (10) is that the connector body and the house is made of insulating material, preferably plastic, designed as a unit (12) in one piece connected by a rear wall (14), further, it has an insert (50, 150, 250) made of electrically conductive material carrying the threaded surface (55, 155, 255) made of electrically conductive material and the contact surface, preferably ring-shaped contact surface (57, 157, 257), which insert (50, 150, 250) can be fitted in a nest (30) formed by the side surface (21) of the connector body part (20) of this unit (12) and the surface (41) of the house part (40) of this unit (12) opposite to this side surface (21), the insert (50, 150, 250) has a part at its side surface suitable for connecting the current to it, and there is an opening (33) on the sidewall of the house part (40) leaving uncovered the side surface of the insert (50, 150, 250) suitable for connecting the current to it, and the insert (50, 150, 250) is secured rotationally in the nest (30) by form-fitting and/or by the catching of a device connected to the side of the insert (50, 150, 250) suitable for connecting the current to it in the edge of the opening (33).

26 Claims, 4 Drawing Sheets

CONNECTOR FOR CONNECTING WELDING TORCH

BACKGROUND

The invention relates to a connector for connecting welding torch, more particularly, it relates to the socket-like connecting member coupling a welding apparatus with a welding torch, which connecting member is usually mounted on the front-plate of the welding apparatus as a connector socket. The connector according to the invention comprises a connector body with a nest for the wire-guide and a nest for the gas supply conduit on the front surface of the connector body, it has one or more electric contacts situated flushed into the front surface and lead out at the rear surface of the connector body, further, it has a wire-guide intermediate piece connected to the nest for the wire-guide from the back and a lead-in leading into the nest for the gas supply conduit from the back, further, it has a threaded surface made of electrically conductive material, a contact surface beside it and a house made of insulating material surrounding the connector body from the side shaped to be suitable for mounting the connector.

Well known is the so called Binzel-type connector, having a connecting body made of brass, the weight and dimensions of which are quite significant, and the welding current is lead to the connecting body from the back using a wire-guide intermediate piece fixed in the connecting body by screw joint, and the current is connected to the wire-guide intermediate piece by a screw joint, e.g. by fixing the cable shoe of the cable carrying the current to it. The connector described in patent specification no. EP 0794 029 is also known, where the weight and the dimensions are slightly reduced due to its construction, however, it still has the disadvantage that the welding current is coupled to the connecting body providing the contact indirectly from the back through a wire-guide intermediate piece, and the current, e.g. the cable shoe of the cable carrying the current to it is connected to the wire-guide intermediate piece by a screw joint. Further, it is a disadvantage of this device as well that the connecting body carrying the nests for the electric contacts is made of electrically conductive material, as a result of which the weight of the connector is still too high.

It is a disadvantage of both constructions that the connecting body is fixed in the plastic house of the connector so as to be prevented from displacement or rotation by an additional screw joint fixing the connecting body to the house, which connection may loosen in the course of regular, normal use.

The above described disadvantages made it necessary to find a solution for the connector eliminating these disadvantages, so the weight and the longitudinal size of which is reduced as compared to the connectors described above, so that it can be mounted more easily and in a simpler way to the welding apparatus when using it, and which is easier to handle due to its lower weight, while the capacity and insulating properties of which are not worse, and further, it must be possible to fashion the connector to be interchangeable so as to ensure connectibility of the widely used connectors used for the same purpose and the units coupled to the connectors.

SUMMARY

The fundamental idea of the invention is that the desired connector can be realised if only the part of the connector directly taking part in transmitting the welding current is made of conducting material., the current is connected to it directly, all other parts of the connector are made of non-conducting material, preferably plastic, and the conducting element and the plastic body carrying it are secured against displacement by form-fitting and/or by the joint establishing the electric connection.

Therefore the connector according to the invention comprises a connector body, a nest for the wire-guide and a nest for the gas supply conduit on the front surface of the connector body, one or more electric contacts situated flushed on the front surface and lead out at the rear surface of the connector body, a wire-guide intermediate piece connected to the nest for the wire-guide from the back and a lead-in leading into the nest for the gas supply conduit, a threaded surface made of electrically conductive material and a contact surface beside it, and a house made of insulating material surrounding the connector body from the side shaped to be suitable for mounting the connector. The essential character of the connector is that the connector body and the house is made of insulating material, preferably plastic, designed as a unit in one piece connected by a rear wall, further, it has an insert made of electrically conductive material carrying the threaded surface made of electrically conductive material and the contact surface, preferably ring-shaped contact surface, which insert can be fitted in a nest formed by the side surface of the connector body part of this unit and the surface of the house part of this unit opposite to this side surface, the insert has a part at its side surface suitable for connecting the current to it, and there is an opening on the sidewall of the house part leaving uncovered the side surface of the insert suitable for connecting the current to it, and the insert is secured rotationally in the nest by form-fitting and/or by the catching of a device connected to the side of the insert suitable for connecting the current to it in the edge of the opening.

At a preferred embodiment the insert is secured against being pulled out from the nest by the design that either the side surface of the insert suitable for connecting the current to it, or a device connected to the side surface of the insert suitable for connecting the current to it is caught in the edge of the opening.

It is an especially advantageous embodiment, where the side surface of the insert suitable for connecting the current to it is a thicker side-portion, which is fitted into the opening on the sidewall of the house part, preferably projecting out of it if the insert is in its position fitted into the nest.

In order to connect a device carrying the current to the insert, the insert suitably has a threaded hole in its thicker side-portion designed to be suitable for connecting the current to it.

At a further preferable embodiment, the thicker side-portion of the insert, suitable for connecting the current to it, fitted in the opening on the house part, projects from the lateral surface of the house part near the rear wall.

In the course of intended use, the connector is fixed in a hole on the front-plate of the welding apparatus. The solution for mounting can be a flange formed by the front wall of the house part and one or more bore-holes on the flange, by which it can be mounted on the front-plate of the welding apparatus by screw joint.

At another possible solution for mounting the connector according to the invention the house part has a flange and one or more tongues protruding from the rear wall towards the flange, in the removed position of the insert the tongue can be bent due to its flexibility towards the connector body part, if the insert is at its place the tongue is prevented from being bent, in its unbent position this tongue defines a retaining groove with the opposite surface of the flange. At this embodiment there is a projection in the end of the tongue or the end of the tongue is thickened so as to form a deeper retaining groove.

The position of the connector according to the invention is secured rotationally in the front-plate of the welding apparatus if there is a shoulder on the rear surface of the flange of the house part with a shape different from circle, and there is an opening on the front-plate receiving the shoulder in a way that the shoulder is fitting in it.

At another preferable embodiment of the connector according to the invention the insert has a cylindrical or prismatic body, preferably a quadratic prism with rounded edges, with an axial bore-hole fitting to the connector body part, and the shape of the receiving nest for the insert is fashioned in a way that the cylindrical or prismatic body is fitting in it.

The wire-guide intermediate piece of the connector according to the invention has a removable wire-guide liner in its axial bore. The wire-guide intermediate piece can be made of material that is not very good electric conductor or can be made of non-conducting material as well.

The insert is made of material of good electric conductivity, preferably copper, brass, copper alloy or other suitable conductive material.

In what follows, the essence of the invention is described in detail by presenting its preferable embodiments, with reference to the accompanying schematic drawings in which:

DETAILED DESCRIPTION OF THE PREFERRED EMBODIMENTS

Figure 1:
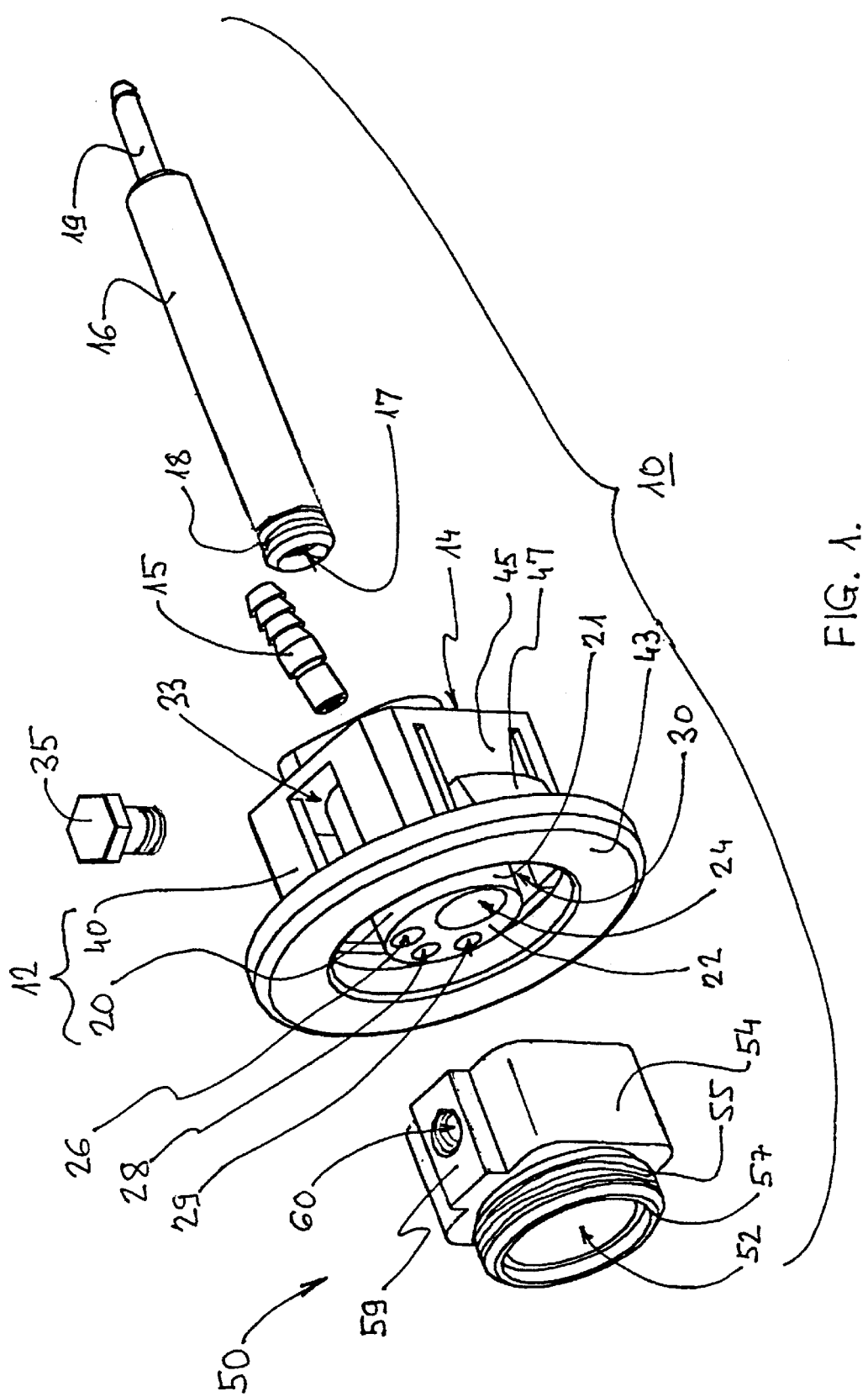
FIG. 1 is an exploded view of the first embodiment of the connector according to the invention.

FIG. 1 shows the exploded view of the embodiment of the connector (10) according to the invention. As it can seen in the figure, the main parts of the connector (10) are the unit (12) consisting of the connector body part (20.) and the house part (40), the insert (50), and the wire-guide intermediate piece (16).

The unit (12) comprises a rear wall (14) and the cylindrical connector body part (20) and the house part (40) surrounding the connector body part (20) laterally at uniform space protrudes forward from the rear wall (14).

The connector body part (20) has a nest (24) for the wire-guide and a nest (26) for the gas supply conduit on its front surface (22), and it has two electric contacts (not indicated in the figure) situated flushed in the holes (28, 29) on its front surface (22) and lead out at its rear wall.

The wire-guide intermediate piece (16) has a bore-hole (17), and it is fixed in the threaded hole in the rear wall (14) of the unit (12) by its screwed end (18). In this position the bore-hole (17) of the wire-guide intermediate piece (16) joins the basin of the nest (24) for the wire-guide. There is a replaceable liner (19), a so called capillary tube in the bore-hole (17) of the intermediate piece (16), supporting the welding wire fed by a wire feeder when using the connector (10), facilitating this way the advance of the welding wire through the connector (10).

Further, the unit (12) has a loading opening leading into the basin of the nest (26) for the gas supply conduit in the connecting body part (20) of the unit (12), and a gas supply chunk (15) can be fitted into this loading opening through a suitable gasketed joint, through which protecting gas can be let into the connector (10) so as to be transported to the welding torch. It is only the gas supply chunk (15) that is shown in the figure.

The connector body part (20), the house part (40) and the rear wall (14) connecting them is made of electrically insulating material, preferably plastic, in one piece as one unit (12).

At the presented embodiment of the connector (10) the insert (50) has a body (54) with an axial bore-hole (52), the shape of the body is a quadratic prism with rounded edges, the insert (50) has a threaded surface (55) on the curved surface of the cylindrical front part of it and a ring-shaped contact surface (57) beside the threaded surface (55) on the frontal area. The insert (50) has a part at its one side surface suitable for connecting the current to it, at this embodiment it is a thicker side-portion (59) protruding from the side of the body (54) behind the threaded surface (55) like a block and a threaded hole (60) in it transverse to the centre line of the insert (50).

The insert (50) is made of material of good electric conductivity, suitably from copper or copper alloy, preferably brass.

The insert (50) is fitted into the nest (30) formed by the side surface (21) of the connector body part (20) and the surface of the house part (40) opposite to it, in the fitted position the connector body part (20) fills the axial bore-hole (52) of the insert (50), and the insert (50) fills the nest (30) having edges adjusted to the shape of the insert (50). This way the insert (50) fitted in the nest (30) is secured rotationally by form fitting.

There is a slit not indicated in the figure in the side surface of the house part (40) surrounding the nest (30) so as to receive the thicker side-portion (59) of the insert (50) and to guide it when inserting it, which slit leads from the mouth of the nest (30) to the opening (33) on the sidewall of the house part (40). In the normal position of the insert (50) fitted into the nest (30), the opening (33) leaves the thicker side-portion (59) of the insert (50) for the electric connection and the threaded hole (60) in it uncovered, which thicker side-portion (59) can be accessed this way.

The current can be coupled to the connector (10) in the position of the insert (50) fitted into the nest (30). In this position the threaded hole (60) on the block-like thicker side-portion (59) protruding through the opening (33) from the inside can be accessed, e.g. the cable shoe of the cable carrying the current can be directly connected to the insert (50U) via screw joint to the threaded hole (60) through the opening (33). The position of the screw joint is indicated by the screw (35) drawn above the position of the threaded hole (60) in the fitted position.

At the same time, this joint protects the insert (50) from being pulled out from the house part (40), as when the insert (50) is pulled, the device fixed, at this example the cable shoe and/or the screw (35), is caught in the front edge of the opening (33).

We note that the fashioning of the insert (50) with thicker side-portion (59) for coupling the current to it together with the opening (33) gives a further form-fitting securing the insert (50) in the nest (30) against rotation, as if the insert (50) turns off, the edge of the thicker side-portion (59) butts on the edge of the opening (33).

Further, we note that coupling the current through the opening (33) by screw joint gives form fitting even by itself securing the insert (50) against rotation in the nest (30).

The solution for mounting the connector (10) is also clearly seen in the figure, at this embodiment it has a circular ring shaped flange (43) projecting from the front wall of the house part (40) and two tongues projecting from the rear wall (14) of the house part (4Q) towards the flange (43), only one of the tongues (45) can be seen in the figure. In the removed position of the insert (50) the tongues can be bent due to their flexibility towards the connector body part (20), if the insert (50) is at its place the tongues are prevented from being bent by catching by the insert (50). In their unbent position the end of these tongues define a retaining groove with the opposite rear surface of the flange (43), which can be seen in FIG. 5 and 6, and it is indicated there.

The deepness of the retaining grove is increased by the projections at the end of the tongues, only projection (47) can be seen in this figure.

The connector (10) is usually mounted on the front-plate of the welding apparatus when using it. Either a circular, or a rectangular opening is formed on the front-plate of the welding apparatus for mounting the connector (10). The house part (40) of the connector (10) is fitted in this opening from the front while keeping the tongues bent, and the front plate is caught by the flange (43) of the house part (40), then the tongues are released taking their unbent position, and in this position the front-plate is fixed in the retaining grove. The tongues are wedged up by fitting the insert (50), and the welding current is coupled to the insert (50) of the connector (10) afterwards, which surely prevents the insert (50) from displacement from the nest (30) at least by the catching of the cable shoe and the screw (35) in the edge of the opening (33) near the flange (43).

Figure 2:
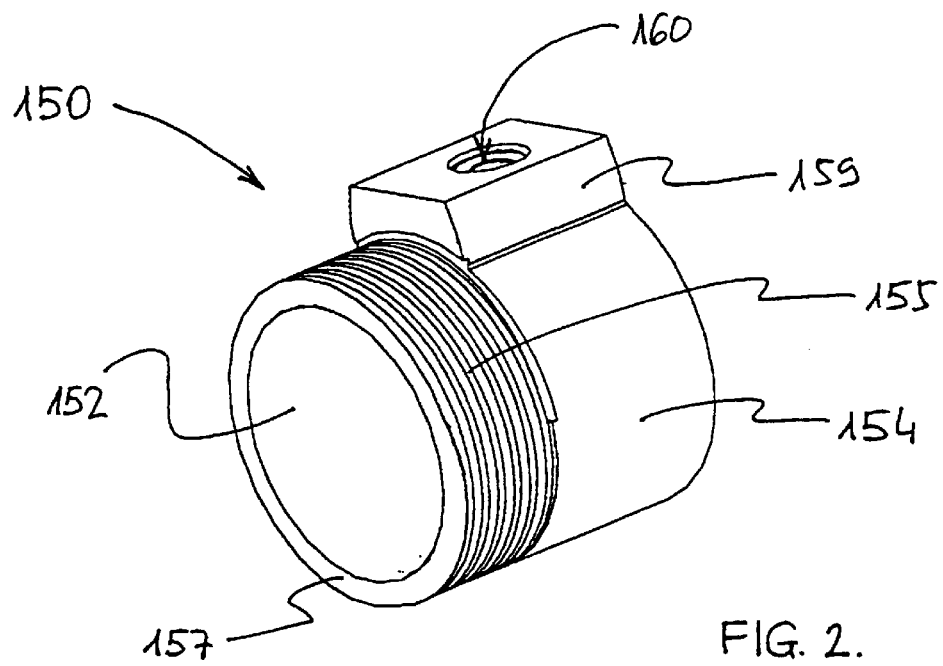
FIG. 2 is a perspective view of an embodiment of the insert of the connector with a second shape.

FIG. 2 shows the perspective view of the insert (150) with a second shape, forming a part of the connector according to the invention. This insert (150) has a cylindrical body (154) having an axial bore-hole (152), and the threaded surface (155) is on the front part of the curved surface of this cylindrical body (154), and the ring-shaped contact surface (157) is beside at its frontal area.

The part of the insert (150) suitable for connecting the current to it is a thicker side-portion (159) protruding from the curved surface of the cylindrical body (154) behind the threaded surface (155), which is a block-like protrusion at this embodiment, containing the threaded hole (160) transverse to the centre line of the insert (150).

The connector not shown in a figure carrying the insert (150) shown in this figure can have a rectangular nest (30) receiving the insert as shown in FIG. 1, or the nest receiving the insert can be essentially of ring-shaped cross-section corresponding to the cylindrical body (154) of the insert (150), where, similarly as described at FIG. 1, there is a slit formed in the side wall of the house part surrounding the nest receiving the thicker side-portion (159), which slit leads to the opening making it possible to access the thicker side-portion (159) of the insert (150), in a way that the cable carrying the current can be coupled to the insert (150) by a screw joint through this opening, using the threaded hole (160), as we have already described it in more detail.

Similarly as described above, the insert (150) in secured rotationally in the nest by the butting of the block-like protrusion forming the thicker side-portion (159) on the—side—edge of the opening providing the accessibility, or, in the fitted position of the connector, by the butting of the connection of the cable carrying the current to the thicker side-portion (159) on the—side—edge of the opening providing the accessibility, while, in the fitted position of the connector, the displacement of the insert (150) outward from the nest is prevented by the butting of the connection of the cable carrying the current to the thicker side-portion (159) on the—front—edge of the opening providing the accessibility.

At the embodiment of the connector containing the insert (150), the insert (150) is made from a pipe or a bar made of material of low specific resistance, preferably copper, brass, or other copper alloy, with its cross section corresponding to the cross section of the insert (150) at its thicker side-portion (159), this way it can be manufactured by relatively little machining.

Figure 3:
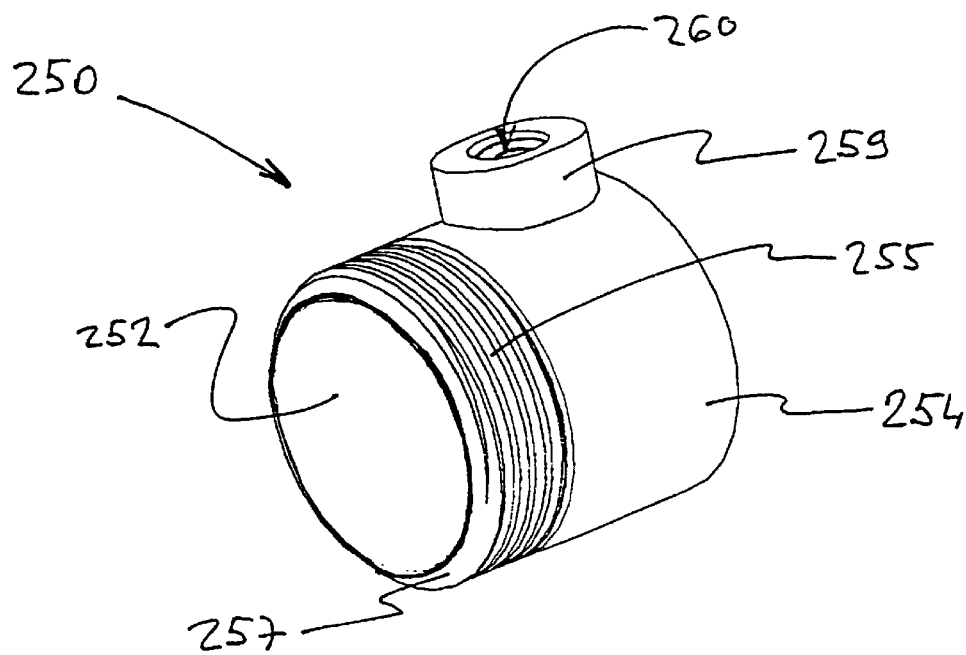
FIG. 3 is a perspective view of an embodiment of the insert of the connector with a third shape.

FIG. 3 shows the perspective view of the insert (250) with a third shape, forming a part of the connector according to the invention. This insert (250) has a cylindrical body (254) having an axial bore-hole (252), and the threaded surface (255) is on the front part of the curved surface of this cylindrical body (254), and the ring-shaped contact surface (257) is beside it at its frontal area.

The part of the insert (250) suitable for connecting the current to it is a thicker side-portion (259) protruding from the curved surface of the cylindrical body (254) behind the threaded surface (255), which is a stud-like projection at this embodiment, containing the threaded hole (260) transverse to the centre line of the insert (250).

Similarly as described at FIG. 2, the connector not shown in a figure carrying the insert (250) shown in this figure can have a rectangular nest (30) receiving the insert as shown in FIG. 1, or the nest receiving the insert can be essentially of ring-shaped cross-section corresponding to the cylindrical body (254) of the insert (250), where there is a slit formed in the side wall of the house part surrounding the nest receiving the thicker side-portion (259), which slit leads to the opening making it possible to access the thicker side-portion (259) of the insert (250), in a way that the cable carrying the current can be coupled to the insert (250) by a screw joint through this opening, using the threaded hole (260), as we have already described it in more detail.

Similarly as described above, the insert (250) in secured rotationally in the nest by the butting of the stud-like projection forming the thicker side-portion (259) on the—side—edge of the opening providing the accessibility, or, in the fitted position of the connector, by the butting of the connection of the cable carrying the current to the thicker side-portion (259) on the—side—edge of the opening providing the accessibility, while, in the fitted position of the connector, the displacement of the insert (250) from the nest is prevented by the butting of the connection of the cable carrying the current to the thicker side-portion (259) on the—front—edge of the opening providing the accessibility.

At the embodiment of the connector containing the insert (250) the insert (250) is also made from a pipe or a bar of the required size, made of material of low specific resistance, preferably copper brass, this way it can be manufactured by little machining. The thicker side-portion (259) is suitably fashioned by fixing a separate stud in the hole on the curved surface of the pipe by a suitable junction. The material of the stud is suitably the same as that of the pipe.

Figure 4:
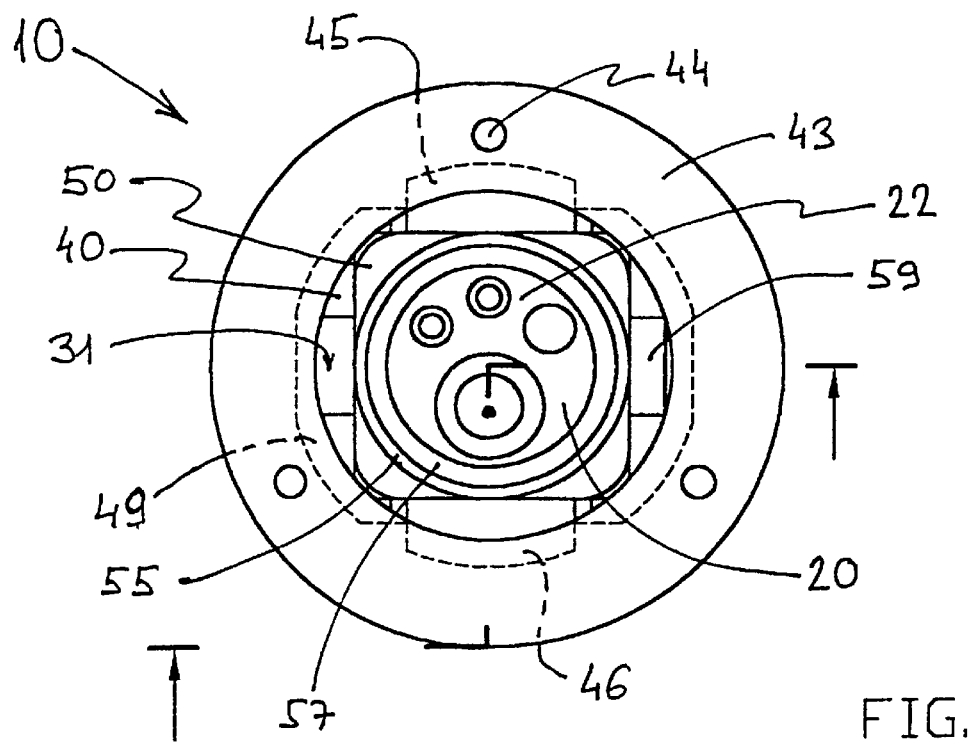
FIG. 4 is the front view of the connector.

FIG. 4 is a front view the connector (10) where the details can be better seen. The connector body part (20) situated inside the house part (40), with the nests in its front surface (22), the insert (50) having a body of quadratic prism shape surrounding the connector body part (20), its threaded surface (55), its ring shaped contact surface (57) and its thicker side-portion (59) are clearly seen in the figure.

Dashed line shows in the figure the tongues (45, 46) behind the flange (43) of the house part (40) in their position wedged up by the insert (50), and the shoulder (49) of a shape different from circle in the rear surface of the flange (43). The figure also shows the driving slit (31) formed in the side wall of the house part (40) leading to the other opening in the side wall, providing a guide for the thicker side-portion of the insert if appropriately positioned, shown front-wise in the figure.

Another solution for mounting the connector (10) are the fixing holes in the flange (43) projecting from the house part (40), out of which we only show fixing hole (44) in the figure.

Connector (10) can be fixed either by the method described above using tongues (45, 46), and/or by screw joint through holes (44). When the connector is mounted, the rectangular shape of the shoulder (49), if placed in a hole of the same shape, prevents the connector from rotational movement and increases the security of the mounting.

Figure 5:
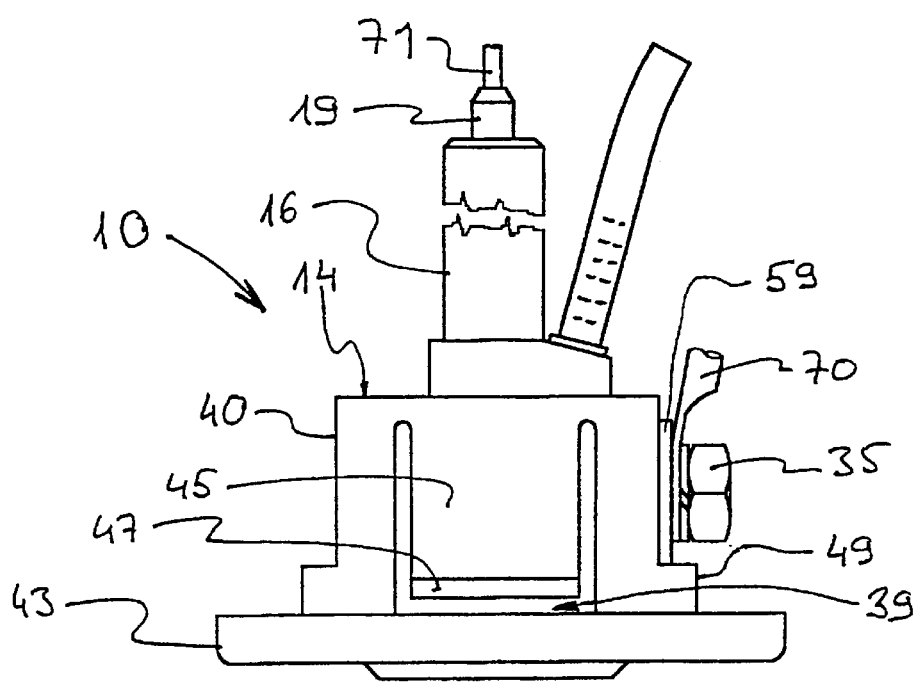
FIG. 5 is the side view of the connector indicating the connections as well.

FIG. 5 is a lateral view of the connector (10). The figure shows the tongue (45) in the side wall of the house part (40) protruding from the rear wall (14) towards the flange (43) with the projection (47) at its end, it also shows the retaining grove (39) determined by the end of the tongue (45) and the opposite surface of the flange (43) which, as we have described above, can be used for fixing the front-plate. The figure also shows the shoulder (49) formed in the rear surface of the flange (43).

The figure also shows the wire-guide intermediate piece (16) mounted on the rear wall (14) together with the liner (19) in it containing the welding wire (71), the gas supply conduit, and the electric and mechanical connection of the cable shoe (70) of the cable carrying the welding current and the thicker side-portion (59) of the insert by the screw (35).

Figure 6:
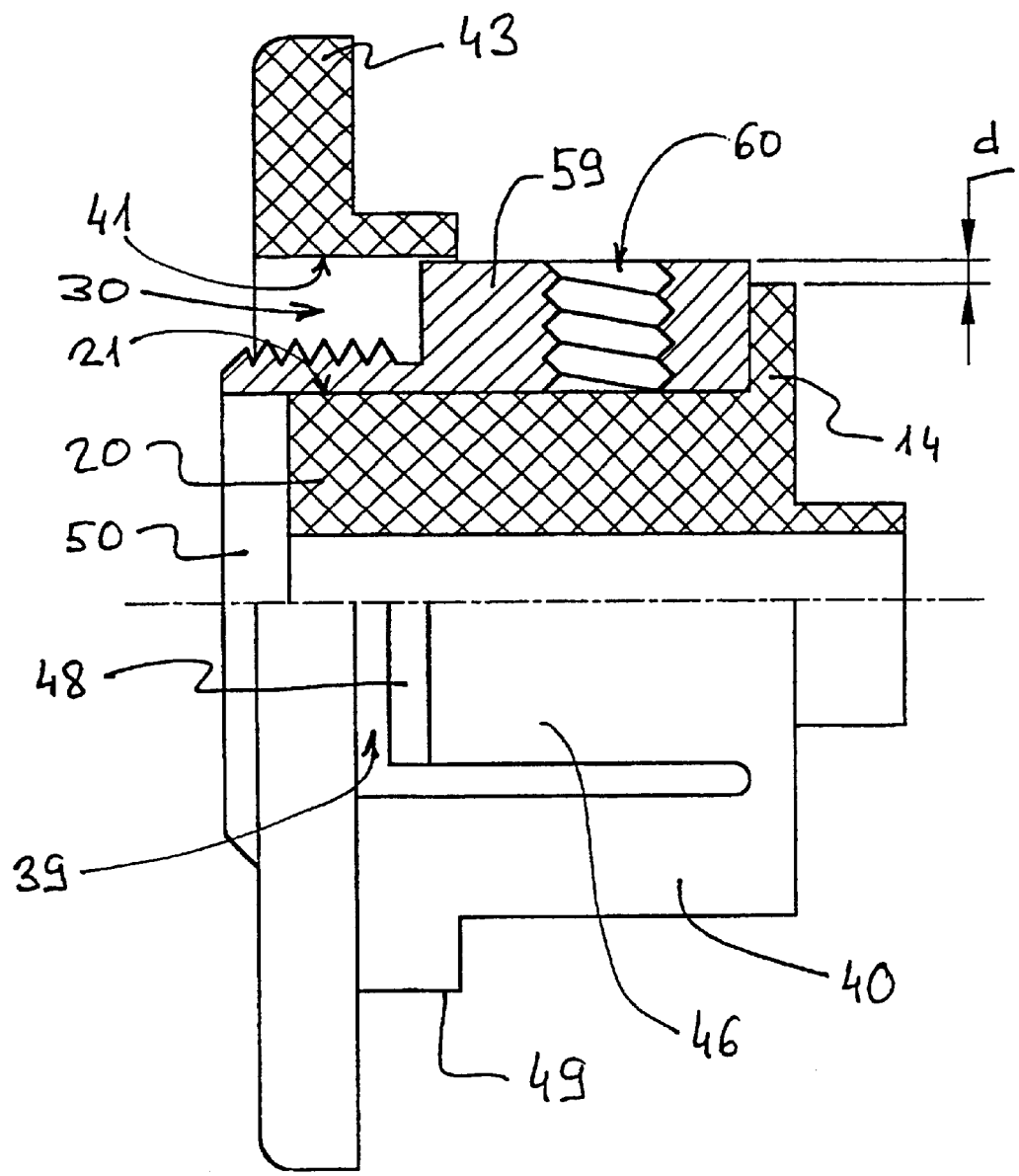
FIG. 6 is the side view of the connector, partly in view and partly in sectional view along the plane indicated in FIG. 4.

FIG. 6 shows the connector partly in view and partly in sectional view along the plane indicated in FIG. 4. The figure clearly shows the connector body part (20) and the house part (40) with the connecting rear wall (14) forming a unit in one piece, the tongue (46) protruding from the rear wall (14) towards the flange (43) with the projection (48) at its end, it also shows the retaining grove (39) determined by the end of the tongue (46) and the opposite surface of the flange (43), and the shoulder (49) formed in the rear surface of the flange (43).

The figure clearly shows the position of the insert (50) in the nest (30) for the insert formed by the side surface (21) of the connector body part (20) and the opposite surface (41) of the house part (40), it also shows the fitting of the axial bore-hole of the insert (50) on the connector body part (20) and the position of the thicker side-portion (59) of the insert (50) and the threaded hole (60) in it in the opening on the side wall of the house part (40). As we have referred to it, the thicker side-portion (59) is projecting out of the lateral surface of the house part (40), the measure of this projection is denoted by "d" in the figure, it facilitates accessing the insert (50).

The connector according to the invention can be implemented in other embodiments as well, it can be designed to provide less possibilities for fixing, e.g. with or without fixing tongues, with or without a shoulder, with flange or with flange provided with fixing holes, or any desired combination of these solutions can be realised. The nest receiving the insert can be cylindrical or prismatic shaped, the house part can be of cylindrical or prismatic shape, depending on the demand. The insert acting as the coupling for the welding current can also be shaped, in harmony with the other parts of the connector, with a side surface of uniform thickness suitable for connecting the current to it or with the shape of a polygon based, preferably regular square or hexagon based prism as well.

The major advantage of the connector according to the invention is that due to its novel construction, as, when the connector is connected, the conductive contact is established through the threaded surface of the insert from the side, and through the ring-shaped contact surface near the threaded surface at the front similarly to the solution applied at traditional connectors, and the welding current is connected to the insert from the side, near the threaded surface, it is only the insert of low weight functioning as the contact for the welding current that must be made of material of good electric conductivity and required hardness, suitably of copper or copper alloy, preferably brass.

As the connector body carrying the electric contacts and having positioning nests is made of non-conducting plastic together with the house, this solution also solves the problem of safely insulating the electric contacts from each other and from the welding current contact, and further, its profiled shape makes it possible to mount the connector on the front-plate of the welding apparatus in a way that it is prevented from displacement, and to mount the insert acting as the electric connection for the welding current in the house part in a way that it is prevented from displacement due to form fitting and/or the mechanical joint of the cable carrying the current.

It is another advantage that the connector can be more precisely adjusted to the power of a certain welding apparatus via choosing the axial size of the insert to be in accordance with the nominal output of the apparatus.

It is a further advantage that as the wire-guide intermediate piece has no conducting function, the room needed to establish the electric connection is reduced, so the axial size of the connector can be smaller, and the wire-guide intermediate piece can be made of material of weaker conductivity and by simpler technology. It is a further advantage that as the number of electric connections and this way the number of contact resistances is reduced by one, the loss on these contacts is reduced. This way the connector can be manufactured to be smaller in size and lower in weight, adjusted more precisely to the required power, using smaller amount of metal, by cheaper technology and in a more economical way as compared to the known connectors.

What is claimed is:

1. A connector for connecting a welding torch to a welding apparatus, the connector comprising a connector body, a nest for a wire-guide, a nest for a gas supply conduit disposed on a frontal area of the connector body, one or more electric contacts situated flush with the front area and lead-out at a rear surface of the connector body, a wire-guide intermediate piece connected to the nest for the wire-guide from the back and a lead-in leading into the nest for the gas supply conduit, a threaded surface made of electrically conductive material, a contact surface disposed beside the threaded surface, and a house made of insulating material surrounding the connector body from the side and shaped to be suitable for mounting the connector, characterized in that the connector body and the house are made of insulating material designed as a unit in one piece connected by a rear wall, wherein the connector body has an insert made of electrically conductive material carrying the threaded surface and the contact surface, said insert having a side surface suitable for connecting the current to the insert, wherein an opening is disposed on a sidewall of the house leaving uncovered the side surface of the insert suitable for connecting the current to the insert, and wherein the insert is secured rotationally in an insert nest.

2. The connector according to claim 1, wherein the insulating material is plastic.

3. The connector according to claim 1, wherein the contact surface is ring-shaped.

4. The connector according to claim 1, wherein the insert is rotationally secured by form fitting in the insert nest.

5. The connector according to claim 1, characterized in that the insert is configured to catch the edge of the opening to secure the insert against being pulled out from the insert nest by a device connected to the side surface of the insert that is configured to be caught in the edge of the opening.

6. The connector according to claim 5, characterized in that the side surface of the insert has a thicker portion configured to fit into the opening on the sidewall of the house.

7. The connector according to claim 6, wherein the thicker portion is configured to project out of the opening on the sidewall of the house when the insert is positioned in the insert nest.

8. The connector according to claim 6, characterized in that the insert has a threaded hole in its side designed to be suitable for connecting the current to it.

9. The connector according to claim 8, characterized in that the thicker side-portion of the insert fitting into the opening projects from the lateral surface of the house near the rear wall.

10. The connector according to claim 9, characterized in that the front plate of the house includes a flange with one or more bore-holes for mounting the connector to the welding torch.

11. The connector according to claim 10, characterized in that the house has a flange protruding from its front plate and a tongue protruding from its rear wall towards the flange, wherein, when the insert is removed, the tongue can be bent due to its flexibility towards the connector body, and when the insert is at its place, the tongue is prevented from being bent, the tongue defining a retaining groove with the opposite surface of the flange in its unbent position.

12. The connector according to claim 11, wherein the end of the tongue is thickened.

13. The connector according to claim 11, characterized in that there is a projection at the end of the tongue.

14. The connector according to claim 13, characterized in that the house includes a matching shoulder behind the flange, the shoulder having a non-circular shape.

15. The connector according to claim 14, characterized in that the insert has a cylindrical or prismatic body, with an axial bore-hole fitting to the connector body, and wherein the shape of the insert nest is fashioned to receive the cylindrical or prismatic body.

16. The connector according to claim 15, wherein the body at least partially has the form of a quadratic prism with rounded edges.

17. A connector for connecting a welding torch to a welding apparatus, the connector comprising a connector body, a nest for a wire-guide, a nest for a gas supply conduit disposed on a frontal area of the connector body, one or more electric contacts situated flush on the frontal area, a lead-out at a rear surface of the connector body, a wire-guide intermediate piece connected to the nest for the wire-guide from the back and a lead-in leading into the nest for the gas supply conduit, a threaded surface made of electrically conductive materials, a contact surface disposed beside the threaded surface, and a house made of insulating material surrounding the connector body from the side and shaped to be suitable for mounting the connector, characterized in that the connector body and the house are made of insulating material, designed as a unit in one piece connected by a rear wall, wherein the connector body has an insert made of electrically conductive material carrying the threaded surface and the contact surface, said insert having a side surface suitable for connecting a current to the insert, wherein an opening is disposed on a sidewall of the house leaving uncovered the side surface of the insert suitable for connecting the current to the insert, and wherein the insert is secured rotationally in an insert nest, and characterized in that the side surface of the insert has a thicker portion configured to fit into the opening on the sidewall of the house.

18. The connector according to claim 17, characterized in that the insert has a threaded hole in its side designed to be suitable for connecting the current to it.

19. The connector according to claim 17, characterized in that the thicker side-portion of the insert fitting into the opening projects from the lateral surface of the house near the rear wall.

20. The connector according to claim 17, characterized in that the front plate of the house includes a flange with one or more bore-holes for mounting the connector to the welding torch.

21. The connector according to claim 17, characterized in that the house has a flange protruding from its front plate and a tongue protruding from its rear wall towards the flange, wherein when the insert is removed, the tongue can be bent due to its flexibility towards the connector body, and when the insert is at its place the tongue is prevented from being bent, the tongue defining a retaining groove with the opposite surface of the flange in its unbent position.

22. The connector according to claim 17, characterized in that there is a projection at the end of the tongue.

23. The connector according to claim 17, characterized in that the house includes a matching shoulder behind the flange, the shoulder having a non-circular shape.

24. The connector according to claim 17, characterized in that the insert has a cylindrical or prismatic body, with an axial bore-hole fitting to the connector, and wherein the shape of the insert nest is fashioned to receive the cylindrical or prismatic body.

25. A connector for connecting a welding torch to a welding apparatus, the connector comprising a connector body, a nest for a wire-guide a nest for a gas supply conduit disposed on a frontal area of the connector body, one or more electric contacts situated flush on the frontal area and lead-out at a rear surface of the connector body, a wire-guide intermediate piece connected to the nest for the wire-guide from the back and a lead-in leading into the nest for the gas supply conduit, a threaded surface made of electrically conductive material, a contact surface disposed beside the threaded surface, and a house made of insulating material surrounding the connector body from the side and shaped to be suitable for mounting the connector, characterized in that the connector body and the house are made of insulating material, designed as a unit in one piece connected by a rear wall, wherein the connector body has an insert made of electrically conductive material carrying the threaded surface and the contact surface, said insert having a side surface suitable for connecting the current to the insert, wherein an opening is disposed on a sidewall of the house leaving uncovered the side surface of the insert suitable for connecting the current to the insert, and wherein the insert is secured rotationally in an insert nest, and characterized in that the insert has a threaded hole in-its side designed to be suitable for connecting the current to it.

26. The connector according to claim 25, characterized in that the insert is configured to catch the edge of the opening to secure the insert against being pulled out from the insert nest by a device connected to the side surface of the insert that is configured to be caught in the edge of the opening.

* * * * *